United States Patent
Kastner et al.

(10) Patent No.: US 11,542,173 B2
(45) Date of Patent: Jan. 3, 2023

(54) PROCESS FOR THE PRODUCTION OF TITANIUM DIOXIDE, AND TITANIUM DIOXIDE OBTAINED THEREBY

(71) Applicant: VENATOR GERMANY GMBH, Duisburg (DE)

(72) Inventors: Juergen Philipp Kastner, Essen (DE); Uwe Rosin, Kamp-Lintfort (DE)

(73) Assignee: VENATOR GERMANY GMBH, Duisburg (DE)

( * ) Notice: Subject to any disclaimer, the term of this patent is extended or adjusted under 35 U.S.C. 154(b) by 1003 days.

(21) Appl. No.: 16/316,352

(22) PCT Filed: Jun. 21, 2017

(86) PCT No.: PCT/EP2017/065229
§ 371 (c)(1),
(2) Date: Jan. 9, 2019

(87) PCT Pub. No.: WO2018/010924
PCT Pub. Date: Jan. 18, 2018

(65) Prior Publication Data
US 2019/0248672 A1    Aug. 15, 2019

(30) Foreign Application Priority Data
Jul. 11, 2016    (DE) .................. 10 2016 112 682.9

(51) Int. Cl.
*C01G 23/08* (2006.01)
*C01G 23/053* (2006.01)
(Continued)

(52) U.S. Cl.
CPC ........... *C01G 23/08* (2013.01); *C01G 23/047* (2013.01); *C01G 23/0532* (2013.01);
(Continued)

(58) Field of Classification Search
CPC .. C01G 23/08; C01G 23/047; C01G 23/0532; C09C 1/3669; C09C 1/3676; C09C 1/3684
See application file for complete search history.

(56) References Cited

U.S. PATENT DOCUMENTS 4,183,768 A    1/1980 Knapp et al.
5,147,629 A    9/1992 Robb et al.
(Continued)

FOREIGN PATENT DOCUMENTS

EP    0 722 905 A1    7/1996
EP    0 772 905 A1    5/1997
(Continued)

OTHER PUBLICATIONS

J. H. Braun: "Titanium Dioxide—A Review", Journal of Coatings Technology, vol. 69, No. 868, pp. 59-72 (1997).
(Continued)

*Primary Examiner* — James A Fiorito
(74) *Attorney, Agent, or Firm* — Norman B. Thot

(57) ABSTRACT

A particulate $TiO_2$ includes a $TiO_2$ content of at least 99 wt.-%, an anatase content of at least 98 wt.-%, a primary crystallite size $X_{50}$ of at least 200 nm, a numerical fraction of $TiO_2$ with a primary crystallite size of at most 100 nm of at most 10%, a specific surface area of at most 8 $m^2/g$ as determined by BET measurements, 1200 ppm to 2400 ppm of alkali with respect to the $TiO_2$ content, an Al content of 1 ppm to 1000 ppm, expressed as Al and with respect to the $TiO_2$ content, a weight ratio of $Al_2O_3$ to $Nb_2O_5$ of from 0.17 to 0.74, and 0.1 wt.-% to 0.3 wt.-% of P, expressed as phosphorus and with respect to the $TiO_2$ content.

14 Claims, 1 Drawing Sheet

(51) Int. Cl.
    *C09C 1/36* (2006.01)
    *C01G 23/047* (2006.01)
(52) U.S. Cl.
    CPC .......... *C09C 1/3669* (2013.01); *C09C 1/3676* (2013.01); *C09C 1/3684* (2013.01); *C01P 2002/60* (2013.01); *C01P 2004/62* (2013.01); *C01P 2004/64* (2013.01); *C01P 2006/12* (2013.01); *C01P 2006/14* (2013.01); *C01P 2006/64* (2013.01); *C01P 2006/80* (2013.01)

(56) References Cited

U.S. PATENT DOCUMENTS

| | | |
|---|---|---|
| 5,630,995 A | 5/1997 | Foulger et al. |
| 5,943,370 A | 8/1999 | Smith |
| 6,113,873 A | 9/2000 | Tunashima et al. |
| 9,127,172 B2 | 9/2015 | Robb et al. |
| 2005/0228112 A1 | 10/2005 | Takahashi et al. |

FOREIGN PATENT DOCUMENTS

| | | |
|---|---|---|
| EP | 0 782 971 A1 | 7/1997 |
| EP | 1 541 638 A1 | 6/2005 |
| GB | 2 247 009 A | 2/1992 |

OTHER PUBLICATIONS

B. Grzmil et al.: "Study of the anatase to rutile transformation kinetics of the modified $TiO_2$", Polish Journal of Chemical Technology, vol. 15, No. 2, pp. 73-80 (2013).

U. Gesenhues: "Calcination of Metatitanic Acid to Titanium Dioxide White Pigments", Chem. Eng. Technol., vol. 24, No. 7, pp. 685-694 (2001).

R. J. B. Peters et al.: "Characterization of Titanium Dioxide Nanoparticles in Food Products: Analytical Methods To Define Nanoparticles, Journal of Agricultural and Food Chemistry, pp. 6285-6293 ((2014).

H. Ratajska: "The effect of certain promoters on $TiO_2$ crystal structure transformation", Journal of Thermal Analysis, vol. 38, pp. 2109-2114 (1992).

DERA Deutsche Rohstoffagentur, Rohstoffinformationen, "The HiTi feedstock market—rutile, leucoxene and others", pp. 1-360 (2021).

F. Izumi: "The Polymorphic Crystrallization of Titanium(IV) Oxide under Hydrothermal Conditions. II. The Roles of Inorganic Anions in the Nucleation of Rutile and Anatase from Acid Solutions", Bulletin of the Chemical Society of Japan, vol. 51, No. 6, pp. 1771-1776 (1978).

K. J. D. Mackenzie et al.: "The Calcination of Titania I-VII, various reprints from Transactions and Journal of the British Ceramic Society, vol. 73, pp. 23-27, 179-183, 185-189, 29-34, 77-84, 121-125, 127-134 (1974).

HORIBA Scientific: "A guidebook to particle size Analysis", pp. 1-14.

Commission Recommendation of Oct. 18, 2011 on the definition of nanomaterial, Official Journal of the European Union, pp. 1-3 (2011).

ANSES: Assessment of the risk associated with nanomaterials, Opinion of Anses, Collective Expert Appraisal Report, pp. 1-191 (2014).

R. A. Spurr et al.: "Quantitative Analysis of Anatase-Rutile Mixtures with an X-Ray Diffractometer, Analytical Chemistry, vol. 29, No. 5, pp. 760-762 (1957).

H. Jensen et al.: "Determination of size distributions in nanosized powders by TEM, XRD, and SAXS", Journal of Experimental Nanoscience. vol. 1, No. 3, pp. 355-373 (2006).

Preparation of Anatase Titanium Dioxie according to EP 0 722 905 A1, pp. 1-4.

Oppositon against European Patent No. 3 481 777 B1 dated Jan. 28, 2022.

Reply Brief to Oppositon against European Patent No. 3 481 777 B1 dated Jun. 15, 2022.

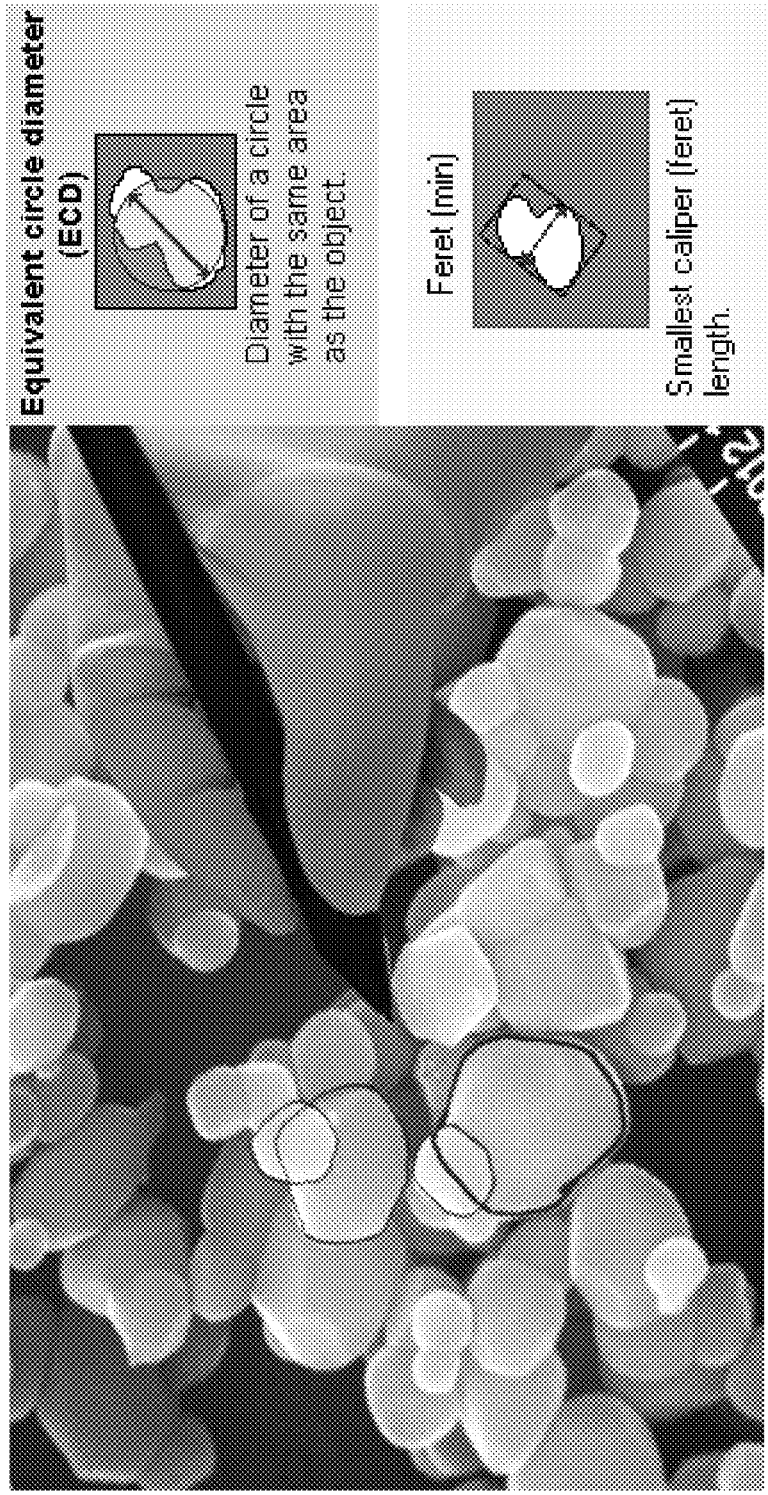

PROCESS FOR THE PRODUCTION OF TITANIUM DIOXIDE, AND TITANIUM DIOXIDE OBTAINED THEREBY

CROSS REFERENCE TO PRIOR APPLICATIONS

This application is a U.S. National Phase application under 35 U.S.C. § 371 of International Application No. PCT/EP2017/065229, filed on Jun. 21, 2017 and which claims benefit to German Patent Application No. 10 2016 112 682.9, filed on Jul. 11, 2016. The International Application was published in English on Jan. 18, 2018 as WO 2018/010924 A1 under PCT Article 21(2).

FIELD

The present invention relates to a process for the production of titanium dioxide with a fraction of at most 10% (numerical) of crystallites with a size of less than 100 nm, as well as the titanium dioxide obtained by this process.

BACKGROUND

In the production of titanium dioxide using the sulfate process, titanium dioxide-containing raw materials (slag, ilmenite) are dried and ground and then digested with concentrated sulfuric acid. The reaction between the raw materials and the concentrated sulfuric acid is carried out in batches in lined reaction vessels. During the digestion reaction, almost all of the metal oxides present in the raw materials which react with sulfuric acid are transformed into the corresponding metal sulfates. After the reaction, a solid mass (digestion cake) remains which is dissolved with water and/or dilute sulfuric acid.

This digestion solution, which is known as black liquor, is completely freed from the undissolved components (digestion residues, gangue) by sedimentation and/or filtration processes. Further on in the process, a suspension of metatitanic acid is produced from the solids-free digestion solution by hydrolysis. The metatitanic acid can be supplied to the downstream process by washing, bleaching and, if appropriate, salt treatment, as well as filtration.

The digestion residues precipitating out during the solid/liquid separation processes as sediment or filter cake are mashed with water and/or dilute sulfuric acid and are dumped after neutralization, usually with calcium hydroxide suspension and fresh filtration.

Processes for the production of such titanium dioxides are known in the prior art. A process for the production of anatase with large crystals using added seed crystals has been described in GB 2 247 009. Alternative processes have been described in EP 0 772 905 and EP 0 782 971. However, these processes are all complicated to control and cannot reliably produce an anatase with the desired color stability.

SUMMARY

An aspect of the present invention is to overcome the disadvantages of the prior art and in particular also to provide a process for the production of titanium dioxide using the sulfate process which can in a simple manner produce a titanium dioxide with a low proportion of primary crystallites with a dimension of at most 100 nm.

In an embodiment, the present invention provides a particulate $TiO_2$ which includes a $TiO_2$ content of at least 99 wt.-%, an anatase content of at least 98 wt.-%, a primary crystallite size $X_{50}$ of at least 200 nm, a numerical fraction of $TiO_2$ with a primary crystallite size of at most 100 nm of at most 10%, a specific surface area of at most 8 $m^2/g$ as determined by BET measurements, 1200 ppm to 2400 ppm of alkali with respect to the $TiO_2$ content, an Al content of 1 ppm to 1000 ppm, expressed as Al and with respect to the $TiO_2$ content, a weight ratio of $Al_2O_3$ to $Nb_2O_5$ of from 0.17 to 0.74, and 0.1 wt.-% to 0.3 wt.-% of P, expressed as phosphorus and with respect to the $TiO_2$ content.

BRIEF DESCRIPTION OF THE DRAWING

The present invention is described in greater detail below on the basis of embodiments and of the drawing in which:

The FIGURE shows an illustration of the measurement procedure and types of diameter of the present invention.

DETAILED DESCRIPTION

As an example, the process in accordance with the present invention may be carried out in the following manner: the titanium dioxide-containing raw materials (slag, ilmenite) are dried and ground and then digested with concentrated sulfuric acid (for example 90% $H_2SO_4$). After a maturation period of several hours, for example, the solid mass obtained from digestion of the titanium dioxide raw material is dissolved in water, for example, with acidified return water. Insoluble components are separated in a clarifier. The clarified titanium-containing solution from the clarifier discharge is freed from the remaining solid in filter presses.

Dissolved trivalent iron is transformed into the divalent form by adding scrap iron, because problematically, $Fe^{2+}$ precipitates out as $Fe(OH)_3$ together with the metatitanic acid and would then be adsorbed on it. Depending on the Fe content, $FeSO_4 \cdot 7H_2O$ precipitates out after cooling and is removed from the system.

In the subsequent hydrolysis, metatitanic acid, a precursor of titanium dioxide, is precipitated out as a solid from the clarified solution by heating and adding water. Advantageously, during the hydrolysis, in accordance with the present invention no crystallization seeds are added and the seeds are formed in situ according to Blumenfeld. In the prior art, it is known to hydrolyze titanyl sulfate in order to precipitate out hydrated titanium oxide, either by adding seed crystals ("Mecklenburg" process) or by inducing seed crystals within the solution by adding water ("Blumenfeld" process).

The metatitanic acid precipitated out during hydrolysis is in the form of a suspension. In one embodiment, the suspension of titanium oxide particles with formula $TiO_{(2-x)}(OH)_{2x}$ ($0 \le x \le 1$) may be metatitanic acid with formula $TiO(OH)_2$. Other hydrated forms such as orthotitanic acid are transformed into metatitanic acid by cleavage of $H_2O$.

This "titanium dioxide suspension" formed by this suspension of titanium oxide hydrate and/or hydrated titanium oxide particles with general formula $TiO_{(2-x)}(OH)_{2x}$ in which ($0 \le x \le 1$), or mixtures thereof, can, for example, have the following properties:
- a Ti content, expressed as titanium dioxide, of 50-400 g $TiO_2$/l,
- a mean particle size of 20 nm-1000 nm, for example, 20 nm-500 nm, for example, 50 nm-200 nm, for example, 50-150 nm,
- a specific surface area for the particles of 200-500 $m^2/g$, for example, 200-400 $m^2/g$, for example, 300-400 $m^2/g$ (measured after drying at 105° C. for at least 120 min, using $N_2$ porosimetry, 5-point BET), a total pore volume for the particles of >0.3 cm$^3$/g, for example, >0.5 cm$^3$/g, for example, >0.7 cm$^3$/g (measured after drying at 105° C. for at least 120 min, using N$_2$ porosimetry, 5-point BET), the crystalline phases of the particles, after drying at 105° C. for at least 120 min, are in the anatase phase. After subtracting a linear background, the ratio of the height of the most intensive reflection of the anatase structure (reflection (101)) to the height of the most intensive reflection of the rutile structure (reflection (110)) is at least 20:1, for example, at least 40:1. XRD analysis carried out as described in the section of the text entitled "Methods" in the description can, for example, exclusively provide reflections of an anatase structure.

The metatitanic acid formed in this manner may contain free as well as bound sulfuric acid, wherein the crystalline portions of the titanium-oxygen compounds it contains, as mentioned above, are in the anatase crystal form and have a typical primary crystallite dimension of approximately 5-15 nm.

The metatitanic acid is filtered off and washed in washing tanks. The pasty filter cake is filtered and washed again after an intermediate treatment.

After cleaning up the metatitanic acid, auxiliary agents are added to the suspension of this intermediate product prior to calcining; these auxiliary agents control the growth of the crystals as well as counter rutile formation to some extent.

In accordance with the present invention, alkali components are added as the auxiliary agents, in particular one or more potassium components, as well as phosphorus components, in particular phosphates. The potassium components may also be replaced by a sodium component or a mixture of the two.

The phosphorus component may be added in the form of phosphoric acid or in the form of a water-soluble phosphate compound, for example, potassium dihydrogen phosphate. It is used in an amount of at least 0.1% by weight, in particular at least 0.12% by weight and at most 0.3% by weight, in particular at most 0.2% by weight, more particularly, for example, in the range 0.12% to 0.2% by weight of P, expressed in terms of phosphorus and expressed as the quantity of TiO$_2$ in the final product in accordance with the present invention. Below the minimum amount of 0.1% by weight, rutile formation is greater and above the maximum amount, crystal growth is inhibited as a function of the calcining temperature.

The potassium components are in particular added in the form of a water-soluble potassium compound, for example, as potassium sulfate or as potassium hydroxide. The potassium may also be used as a counter-ion to the phosphate group, so that the pH of the final product can also be adjusted (pH 7.0 to 8.5). In this regard, in accordance with the present invention, depending on the added amount of phosphorus, 1200 to 1400 ppm of potassium with respect to the quantity of TiO$_2$ is used.

The metatitanic acid washed in the earlier stages which have been described and treated with the alkali and phosphorus components is then dewatered using filtration equipment and supplied to the calcining furnace. During calcining, water from the supplied TiO$_2$ filter cake is vaporized, and the sulfuric acid still adhering from digestion is decomposed and driven off.

Calcining the starting material, which is usually at ambient temperature, is carried out until a constant temperature is reached, at a temperature of at least 940° C., in particular at least 960° C. and less than 1020° C., in particular less than 1010° C., in particular in the range 970° C. to 990° C. Calcining is continued at a constant temperature for a period of time which depends on the calcining temperature, until the primary crystallites reach the desired size with $X_{50}$ (mean primary crystallite size with 50% smaller and 50% larger than the mean value $X_{50}$) of at least 160 nm, in particular at least 200 nm, and, for example, less than 300 nm, and the calcined TiO$_2$ contains a proportion of less than 1.5% by weight of rutile with respect to the weight of the particles. The time period for calcining is usually 40 to 300 minutes in the constant temperature range mentioned above.

Because of impurities in the raw materials, in particular niobium, which cannot be washed out, the anatase product becomes bluer and bluer with increasing calcining temperature because, in order to compensate for the pentavalent niobium, a reduction of Ti$^{4+}$ occurs to form the blue Ti$^{3+}$. To compensate for the color, in accordance with the present invention, an aluminum component is added. The addition may be in the form of aluminum sulfate or aluminum hydroxide, and the amount added is at least 1 ppm, in particular at least 10 ppm and at most 1000 ppm, in particular at most 500 ppm of Al, expressed as Al and with respect to the quantity of TiO$_2$. Quantities beyond 1000 ppm inhibit the growth of crystals and then no longer provide the desired properties for the same temperature. A weight ratio of Al$_2$O$_3$ to Nb$_2$O$_5$ of between 0.17 and 0.74 has been shown to be advantageous.

The calcining temperature in cooperation with the added auxiliary agents provides a product with the desired properties as regards primary crystallite size, in particular the specific surface area, proportion of crystallites with a proportion of at most 10% (numerical) with a dimension of less than 100 nm (nano-fraction) and color.

In accordance with the present invention, a particulate TiO$_2$ can thus be obtained which may have the following properties:
 a TiO$_2$ content of at least 99% by weight;
 an anatase content of more than 98%, in particular more than 98.5% by weight;
 a primary crystallite size $X_{50}$ of at least 200 nm, and in particular at most 300 nm (determined from the numerical distribution);
 a numerical fraction of TiO$_2$ with a primary crystallite size of at most 100 nm of at most 10% ($X_{10}$) (determined by counting these crystallites in TEM or SEM images—Feret method);
 a specific surface area of at most 8 m$^2$/g, in particular <6 m$^2$/g (determined by BET measurements);
 1200 to 2400 ppm of alkali, in particular potassium, with respect to the quantity of TiO$_2$;
 an Al content of at least 1 ppm and at most 1000 ppm of Al, expressed as Al and with respect to the quantity of TiO$_2$;
 a weight ratio of Al$_2$O$_3$ to Nb$_2$O$_5$ in the range 0.17 to 0.74;
 0.1% by weight and at most 0.3% by weight of P, expressed as phosphorus and with respect to the quantity of TiO$_2$ in the final product; and
 a proportion of less than 1.5% by weight, in particular less than 1% by weight of rutile, with respect to the weight of the particles.

The present invention thus concerns a particulate TiO$_2$ with the following properties:
 a TiO$_2$ content of at least 99% by weight;
 an anatase content of at least 98% by weight;
 a primary crystallite size $X_{50}$ of at least 200 nm (determined from the numerical distribution);
 a numerical fraction of TiO$_2$ with a primary crystallite size of at most 100 nm of at most 10% ($X_{10}$);

a specific surface area of at most 8 m²/g (determined by BET measurements);

1200 to 2400 ppm of alkali, in particular potassium, with respect to the quantity of $TiO_2$, an Al content of at least 1 ppm and at most 1000 ppm of Al, expressed as Al and with respect to the quantity of $TiO_2$;

a weight ratio of $Al_2O_3$ to $Nb_2O_5$ in the range 0.17 to 0.74; and at least 0.1% by weight and at most 0.3% by weight of P, expressed as phosphorus and with respect to the quantity of $TiO_2$.

A particulate $TiO_2$ as defined above, with an anatase content of at least 98.5% by weight.

A particulate $TiO_2$ as defined above, with a numerical fraction of $TiO_2$ with a primary crystallite size of at most 100 nm of at most 8%.

A particulate $TiO_2$ as defined above, with a specific surface area of at most 6 m²/g (determined by BET measurements).

A particulate $TiO_2$ as defined above, with a primary crystallite size $X_{50}$ of at most 300 nm.

The present invention also provides a process for the production of particulate $TiO_2$ as defined above, in which metatitanic acid, which is, for example, obtainable using the sulfate process and which is in the form of a suspension, is supplemented with an alkali compound in a quantity of 1200 to 2400 ppm of alkali, a phosphorus compound in a quantity of at least 0.1% by weight and at most 0.3% by weight of P, expressed as phosphorus, and an aluminum compound in a quantity of at least 1 ppm and at most 1000 ppm of Al, expressed as Al, wherein all of the quantities are respectively with respect to the quantity of $TiO_2$, is, for example, dewatered and dried and then undergoes calcining in a manner such that the particulate $TiO_2$ is held at a constant temperature of between at least 940° C. and at most 1020° C. for a period of time until the numerical fraction $X_{50}$ of $TiO_2$ has a primary crystallite size of at least 200 nm, and the particulate $TiO_2$ obtained after cooling undergoes a grinding treatment, in particular a dry grinding.

Because of its smaller quantities of particle sizes in the nanometer range, the $TiO_2$ material in accordance with the present invention is suitable for those applications in which such a proportion of such particle sizes might be considered to be unsafe, for example, in the field of foodstuffs, pharmaceuticals, cosmetics and care products for the human body, as well as in polymers which are used as packaging for foodstuffs or as fibers. In the latter applications, the $TiO_2$ material in accordance with the present invention advantageously undergoes a subsequent treatment with an organic compound. The present invention therefore also concerns:

particulate $TiO_2$ as described above, wherein at least a portion of the surface of the particles has been coated with an organic compound or mixtures thereof;

particulate $TiO_2$ as described above, wherein the organic compound is selected from polyglycols including polyethylene glycols, polypropylene glycols or copolymers thereof, carboxylic acids and their alkali salts, polyvalent alcohols, including trimethylolpropane, trimethylolethane, pentaerythritol and neopentyl glycol, silanes, siloxanes and siloxane derivatives, silicone oils, alkali salts of polyphosphates, amino alcohols, salts of poly(meth)acrylic acid or poly(meth)acrylate copolymers (for example, sodium, potassium or ammonium polyacrylates) or mixtures thereof; and particulate $TiO_2$ as described above, wherein the organic substance is used in a quantity of 0.01% to 8% by weight, for example, 0.05% to 4% by weight, for example, 0.1% to 1.5% by weight, with respect to the total weight of the particulate $TiO_2$.

Experimental Section

Description of the Measurement Methods Used

Determination of Mean Particle Size

In order to determine the mean particle size of titanium oxide with general formula $TiO_{(2-x)}(OH)_{2x}$ in which $0<x\leq1$, the aqueous "titanium oxide suspension" was initially diluted in a solution of 1 g of Calgon/1 of deionized water in order to produce a concentration of approximately 0.4 g of $TiO_2$ in 60 ml of solution. The "titanium oxide" suspension diluted in this manner was initially dispersed for 5 min in an ultrasound bath (for example, a Sonorex Super RK106, from Bandelin) with stirring, and then dispersed for 5 min with an ultrasound finger (Sonifier® W-450 from Branson with a gold booster for amplitude reinforcement and ¾ inch horn). The particle size distribution was determined by a photon correlation spectrometer using Zetasizer Advanced Software, for example the Zetasizer 1000 HSa, from Malvern. A measurement was carried out with multimode acquisition at a temperature for the measurement of 25° C. The mean particle size $d_{50}$ given was the $d_{50}$ value for volume distribution, which corresponds to the mass distribution with density taken into account.

Determination of Phase and Crystallite Size in Accordance with Scherrer

In order to determine the crystal phase (phase identification), an X ray diffractogram was recorded. On it, the intensities according to the Bragg relationship of the X rays deflected by the lattice planes of a crystal were measured against the angle of deflection 2 theta. A phase has a typical X ray diffraction diagram.

Measurement and Analysis

The material to be investigated was painted onto the preparation support with the aid of an object carrier. The powder diffractometry data was analyzed with the aid of the JCPDS powder diffractometry database. The phase was identified when the measured diffraction diagram matched the recorded pattern of spots.

Typical measurement conditions were as follows: 2 theta=10°-70°, measured in steps of 2 theta=0.02°, measurement period per step: 1.2 s.

The crystallite size was determined using the Scherrer method from the half-height widths of the anatase reflection at a 2 theta of 25.3° using the following formula:

$$D \text{ crystallite} = K * 1 / (S * \cos(theta))$$

wherein:

D crystallite: crystallite size [nm]

K: shape constant=0.9 theta: angle of measured reflection 2 theta/2

S: half-height width of measured reflection l: wavelength of X ray beam used.

Determination of Specific Surface Area (Multipoint Method) and Analysis of Pore Structure using the Nitrogen Gas Adsorption Method ($N_2$ Porosimetry)

The specific surface area and the pore structure (pore volume and pore diameter) were determined by $N_2$ porosimetry using the Autosorb® 6 or 6B instrument from Quantachrome GmbH. The BET (Brunnauer, Emmet and Teller) specific surface area was determined in accordance with DIN ISO 9277; the pore distribution was measured in accordance with DIN 66134.

Sample Preparation ($N_2$ Porosimetry)

The sample weighed into the measurement cell was initially dried in the heating station for 16 h under vacuum.

Next, it was heated under vacuum to 180° C. over approximately 30 min. The temperature was then maintained for one hour, still under vacuum. The sample was considered to have been sufficiently degassed when in the degasser a pressure of 20-30 millitorr was set and, after uncoupling the vacuum pump, the needle on the vacuum gauge remained stable for approximately 2 min.

Measurement/Analysis ($N_2$ Porosimetry)

The entire $N_2$ isotherm was measured using 20 adsorption points and 25 desorption points. The measurements were analyzed as follows:

Specific Surface Area (multi-point BET)

5 measurement points in the analysis range of 0.1 to 0.3 p/p0

Total Pore Volume Analysis

The pore volume was determined in accordance with the Gurvich rule (determination from the last adsorption point).

The total pore volume was determined in accordance with DIN 66134, applying the Gurvich rule. In accordance with what is known as the Gurvich rule, the total pore volume of a sample is determined from the final pressure point in the adsorption measurement:

p. pressure of adsorptive
p0. saturated vapor pressure of adsorptive
Vp. specific pore volume in accordance with Gurvich rule (total pore volume at p/Po = 0.99) reached by quasi-final adsorption pressure point obtained from the measurement.

Determination of Mean Pore Diameter (Hydraulic Pore Diameter):

The relationship $4 V_p/A_{BET}$ was used for the calculation, corresponds to the "Average Pore Diameter". $A_{BET}$ specific surface area in accordance with ISO 9277.

Crystallite Size Determination of Calcined $TiO_2$ Samples

The method determines dimensional data of pigment crystallites, such as the number and volume distribution, the nano-fraction, shape information and typical parameters such as $X_{10}$, $X_{50}$ and $X_{90}$. With the aid of electron microscope images, the edges of the crystals were outlined using a touch-sensitive screen. The object data obtained in this manner were brought together in an overall distribution.

The pigment was dispersed with a solvent and the suspension was dried on a support. A SEM and/or TEM image was produced at four different locations of the support. If a nanoclassification was to be carried out in accordance with EU regulations, then the magnification must be at least V=50000.

The SEM or TEM images were analyzed using Image Pro Plus software with the aid of a macro. The outer edges of the individual crystallites were here outlined with the stylus, as can be seen in the FIGURE, which shows an illustration of the measurement procedure and types of diameter.

In total, at least 500 particles must be assessed on all the images. The dimensional data obtained in this manner was analyzed using an Excel spreadsheet.

The analysis contains:
volume and numerical distribution of the mean (primary) crystallite diameter (ECD)
numerical distribution of the smallest (primary) crystallite diameter (Feret min)
nano-fraction in accordance with EC regulations
$X_{10}$, $X_{50}$, $X_{90}$ distribution data In order to determine the nano-fraction, the smallest diameter flank ($Feret_{min}$) and the mean diameter from the crystal size data (ECD: Equivalent) were determined. The calibration was carried out from the scale bars of each individual image.

Determination of Titanium, Expressed as $TiO_2$

Determination of $TiO_2$ content on pressed powder pellets using X ray fluorescence analysis (XRFA)

Determination of Al

The Al content of the pressed powder pellets was determined using X ray fluorescence analysis (XRFA).

Determination of P

The P content of the pressed powder pellets was determined using X ray fluorescence analysis (XRFA).

Determination of Nb

The Nb content of the pressed powder pellets was determined using X ray fluorescence analysis (XRFA).

Determination of K

The K content of the pressed powder pellets was determined using X ray fluorescence analysis (XRFA).

Determination of Colorimetric Measurement b* (in accordance with CIELAB, DIN 6174 or ISO 7724/2)

Determination of colorimetric measurements L*, a*, b* using the CIELAB system from the measurement of the standard color values X, Y, Z of pressed powder pellets using the Color Eye 7000A measurement system (pellets produced in accordance with DIN 5033 T9).

Measurement Protocol: Illuminant C, 2° Standard Observer, Measurement Geometry: 45/0

The invention will be explained in more detail by means of the following Comparative Examples and Examples.

COMPARATIVE EXAMPLE A

A titanyl sulfate solution containing 230 g/l of $TiO_2$ was obtained using the known sulfate process for the production of titanium dioxide by digesting titanium slag in concentrated sulfuric acid, then dissolving the digestion cake obtained in water and separating the undigested residues. In a subsequent Blumenfeld hydrolysis, metatitanic acid, a precursor of titanium dioxide, was precipitated out of the titanyl sulfate solution as a solid by heating to 98° C. and adding hot water. The metatitanic acid precipitated out during the hydrolysis was washed at a temperature of 80° C. on suction filters with 8 l of demineralized water per kg of $TiO_2$, and then treated for 1 hour at 80° C. with Ti(III) solution in order to remove adsorbed heavy metals and then washed again on a suction filter with 8 l of demineralized water per kg of $TiO_2$. Next, the filter cake was elutriated with water to 300 g/l of $TiO_2$ (washed metatitanic acid).

Potassium sulfate powder (1650 ppm of potassium expressed as $TiO_2$) and 85% phosphoric acid (0.14% by weight of phosphorus expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 930° C. in a laboratory muffle furnace. The calcined material was ground in a spiral jet mill.

COMPARATIVE EXAMPLE B

A washed metatitanic acid was produced as described in Comparative Example A and adjusted to 300 g/l of $TiO_2$ with water.

Potassium sulfate powder (1650 ppm of potassium expressed as $TiO_2$), 85% phosphoric acid (0.14% by weight of phosphorus expressed as $TiO_2$) and aluminum hydroxide powder (110 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 930° C. in a laboratory muffle furnace. The calcined material was ground in a spiral jet mill.

COMPARATIVE EXAMPLE C

A washed metatitanic acid was produced as described in Comparative Example A and adjusted to 300 g/l of $TiO_2$ in water.

25% potassium hydroxide (1650 ppm of potassium expressed as $TiO_2$), 85% phosphoric acid (0.14% by weight of phosphorus expressed as $TiO_2$) and aluminum sulfate powder (110 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 930° C. in a laboratory muffle furnace. The calcined material was ground in a spiral jet mill.

COMPARATIVE EXAMPLE D

A washed metatitanic acid was produced as described in Comparative Example A and adjusted to 300 g/l of $TiO_2$ with water.

Potassium sulfate powder (1650 ppm of potassium expressed as $TiO_2$), 85% phosphoric acid (0.14% by weight of phosphorus expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 980° C. in a laboratory muffle furnace. The calcined material was ground in a spiral jet mill.

COMPARATIVE EXAMPLE E

A washed metatitanic acid was produced as described in Comparative Example A and adjusted to 300 g/l of $TiO_2$ with water.

Potassium sulfate powder (1650 ppm of potassium expressed as $TiO_2$), 85% phosphoric acid (0.14% by weight of phosphorus expressed as $TiO_2$) and aluminum hydroxide powder (110 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 1040° C. in a laboratory muffle furnace. The calcined material was ground in a spiral jet mill.

COMPARATIVE EXAMPLE F

A washed metatitanic acid was produced as described in Comparative Example A and adjusted to 300 g/l of $TiO_2$, with water.

Potassium sulfate powder (1650 ppm of potassium expressed as $TiO_2$), 85% phosphoric acid (0.14% by weight of phosphorus expressed as $TiO_2$) and aluminum hydroxide powder (1000 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 980° C. in a laboratory muffle furnace. The calcined material was ground in a spiral jet mill.

COMPARATIVE EXAMPLE G

A washed metatitanic acid was produced as described in Comparative Example A and adjusted to 300 g/l of $TiO_2$ with water.

Potassium sulfate powder (1100 ppm of potassium expressed as $TiO_2$), 85% phosphoric acid (0.09% by weight of phosphorus expressed as $TiO_2$) and aluminum hydroxide powder (110 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 930° C. in a laboratory muffle furnace. The calcined material was ground in a spiral jet mill.

EXAMPLE 1

A washed metatitanic acid was produced as described in Comparative Example A and adjusted to 300 g/l of $TiO_2$, with water.

Potassium sulfate powder (1650 ppm of potassium expressed as $TiO_2$), 85% phosphoric acid (0.14% by weight of phosphorus expressed as $TiO_2$) and aluminum hydroxide powder (110 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 980° C. in a laboratory muffle furnace. The calcined material was ground in a spiral jet mill.

EXAMPLE 2

A washed metatitanic acid was produced as described in Comparative Example A and adjusted to 300 g/l of $TiO_2$, with water.

25% potassium hydroxide (1650 ppm of potassium expressed as $TiO_2$), 85% phosphoric acid (0.14% by weight of phosphorus expressed as $TiO_2$) and aluminum hydroxide powder (110 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 980° C. in a laboratory muffle furnace. The calcined material was ground in a spiral jet mill.

EXAMPLE 3

A washed metatitanic acid was produced as described in Comparative Example A and adjusted to 300 g/l of $TiO_2$, with water.

Potassium sulfate powder (1650 ppm of potassium expressed as $TiO_2$), 85% phosphoric acid (0.14% by weight of phosphorus expressed as $TiO_2$) and aluminum hydroxide powder (60 ppm of aluminum expressed as $TiO_2$) were added with stirring to 6 kg of this washed metatitanic acid in a mixing tank with a propeller stirrer, stirring was continued for a further 1 hour, drying was carried out in a drying cabinet at 105° C. and then calcining was carried out in batches for 90 min at 980° C. in a laboratory muffle furnace. The calcined material was ground in a spiral jet mill.

TABLE 1

Summary of Experimental Conditions

| Example | K component | K added [ppm] | P component | P added Al [%] | Al component | Al added [ppm] | Calcining temperature [° C.] |
|---|---|---|---|---|---|---|---|
| A | $K_2SO_4$ | 1650 | $H_3PO_4$ | 0.14 | None | 0 | 930 |
| B | $K_2SO_4$ | 1650 | $H_3PO_4$ | 0.14 | $Al(OH)_3$ | 110 | 930 |
| C | KOH | 1650 | $H_3PO_4$ | 0.14 | $Al_2(SO_4)_3$ | 110 | 930 |
| D | $K_2SO_4$ | 1650 | $H_3PO_4$ | 0.14 | None | 0 | 980 |
| E | $K_2SO_4$ | 1650 | $H_3PO_4$ | 0.14 | $Al(OH)_3$ | 110 | 1040 |
| F | $K_2SO_4$ | 1650 | $H_3PO_4$ | 0.14 | $Al(OH)_3$ | 1000 | 980 |
| G | $K_2SO_4$ | 1100 | $H_3PO_4$ | 0.09 | $Al(OH)_3$ | 110 | 980 |
| 1 | $K_2SO_4$ | 1650 | $H_3PO_4$ | 0.14 | $Al(OH)_3$ | 110 | 980 |
| 2 | KOH | 1650 | $H_3PO_4$ | 0.14 | $Al_2(SO_4)_3$ | 110 | 980 |
| 3 | $K_2SO_4$ | 1650 | $H_3PO_4$ | 0.14 | $Al(OH)_3$ | 60 | 980 |

TABLE 2

Results

| Example | $Al_2O_3/Nb_2O_5$ | Anatase [%] | $TiO_2$ [%] | Crystallite Size $X_{50}$ [nm] | Nano-Fraction [% <100 nm] | BET [m²/g] | CIE b* |
|---|---|---|---|---|---|---|---|
| A | — | 98.9 | 99.1 | 100 | 49 | 10.7 | 0.2 |
| B | 0.66 | 99.1 | 99.0 | 98 | 52 | 10.8 | 0.3 |
| C | 0.66 | 98.6 | 99.0 | 95 | 58 | 11.1 | 0.3 |
| D | — | 98.6 | 99.2 | 218 | 5 | 5.3 | −1.7 |
| E | 0.66 | 97.5 | 99.1 | 293 | 2 | 3.0 | 1.2 |
| F | 6.00 | 98.9 | 98.9 | 180 | 17 | 8.8 | 1.6 |
| G | 0.66 | 98.0 | 99.3 | 237 | 3 | 4.8 | 0.9 |
| 1 | 0.66 | 98.8 | 99.0 | 213 | 7 | 5.5 | 0.7 |
| 2 | 0.66 | 98.9 | 99.0 | 208 | 4 | 5.2 | 0.7 |
| 3 | 0.36 | 98.7 | 99.1 | 215 | 5 | 5.4 | 0.5 |

Visual Perceived Color by Observer of $TiO_2$ Powder

| CIE b* | >0.5 | yellowish white |
|---|---|---|
| CIE b* | 0 to 0.5 | neutral white |
| CIE b* | <0 | bluish white |

The product in accordance with the present invention is distinguished by a crystallite size with a small numerical fraction of crystallites of at most 100 nm of at most 10%, with a warm shade, which is of advantage, in particular with cosmetic products.

The present invention is not limited to embodiments described herein; reference should be had to the appended claims.

What is claimed is:

1. A particulate $TiO_2$ comprising:
   a $TiO_2$ content of at least 99 wt.-%;
   an anatase content of at least 98 wt.-%;
   a primary crystallite size $X_{50}$ of at least 200 nm;
   a numerical fraction of $TiO_2$ with a primary crystallite size of at most 100 nm of at most 10%;
   a specific surface area of at most 8 m²/g as determined by BET measurements;
   1200 ppm to 2400 ppm of alkali with respect to the $TiO_2$ content;
   an Al content of 1 ppm to 1000 ppm, expressed as Al and with respect to the $TiO_2$ content;
   a weight ratio of $Al_2O_3$ to $Nb_2O_5$ of from 0.17 to 0.74; and
   0.1 wt.-% to 0.3 wt.-% of P, expressed as phosphorus and with respect to the $TiO_2$ content.

2. The particulate $TiO_2$ as recited in claim 1, wherein the alkali is potassium.

3. The particulate $TiO_2$ as recited in claim 1, wherein the anatase content is at least 98.5 wt.-%.

4. The particulate $TiO_2$ as recited in claim 1, wherein the numerical fraction of $TiO_2$ with the primary crystallite size of at most 100 nm is at most 8%.

5. The particulate $TiO_2$ as recited in claim 1, wherein the specific surface area is at most 6 m²/g.

6. The particulate $TiO_2$ as recited in claim 1, wherein the primary crystallite size $X_{50}$ is at most 300 nm.

7. The particulate $TiO_2$ as recited in claim 1, wherein,
   the particulate $TiO_2$ comprises particles, and
   at least a portion of a surface of the particles is coated with an organic compound or with mixtures of organic compounds.

8. The particulate $TiO_2$ as recited in claim 7, wherein the organic compound is selected from polyglycols, carboxylic acids and their alkali salts, polyvalent alcohols, silanes, siloxanes and siloxane derivatives, silicone oils, alkali salts of polyphosphates, amino alcohols, salts of poly(meth)acrylic acid or poly(meth)acrylate copolymers, or mixtures thereof.

9. The particulate $TiO_2$ as recited in claim 8, wherein,
   the polyglycols are selected from polyethylene glycols, polypropylene glycols or copolymers thereof,
   the polyvalent alcohols are selected from trimethylolpropane, trimethylolethane, pentaerythritol and neopentyl glycol, and
   the salts of poly(meth)acrylic acid or poly(meth)acrylate copolymers are selected from sodium, potassium or ammonium.

10. The particulate $TiO_2$ as recited in claim 8, wherein the organic compound is used in a quantity of 0.01 wt.-% to 8 wt.-% with respect to a total weight of the particulate $TiO_2$.

11. A process for a production of the particulate $TiO_2$ as recited in claim 10, the process comprising:
   supplementing metatitanic acid with,
      an alkali compound in a quantity of 1200 ppm to 2400 ppm of alkali,
      a phosphorus compound in a quantity of 0.1 wt.-% to 0.3 wt.-% by weight of P, expressed as phosphorus, and an aluminum compound in a quantity of 1 ppm to 1000 ppm of Al, expressed as Al, to thereby obtain a mixture, wherein, each of the quantity of the alkali compound, the quantity of the phosphorus compound and the quantity off the aluminum compound are with respect to the $TiO_2$ content;

calcining the mixture at a constant temperature of 940° C. to 1020° C. until a numerical fraction $X_{50}$ of $TiO_2$ has a primary crystallite size of at least 200 nm, to thereby obtain a calcined mixture;

cooling the calcined mixture to thereby obtain a cooled calcined mixture; and grinding the cooled calcined mixture to thereby obtain the particulate $TiO_2$.

12. The process as recited in claim 11, wherein, the metatitanic acid is obtained using a sulfate process and is provided as a suspension.

13. The process as recited in claim 11, further comprising:

dewatering the mixture; and drying the mixture.

14. The process as recited in claim 11, wherein the grinding is a dry grinding.

\* \* \* \* \*